(12) United States Patent
Howald

(10) Patent No.: US 6,374,493 B1
(45) Date of Patent: Apr. 23, 2002

(54) WHEEL CASTING AND WHEEL ASSEMBLY

(75) Inventor: Gene A. Howald, New Hope, PA (US)

(73) Assignee: Hutchinson S.A. (FR)

( * ) Notice: Subject to any disclaimer, the term of this patent is extended or adjusted under 35 U.S.C. 154(b) by 20 days.

(21) Appl. No.: 09/655,384

(22) Filed: Sep. 5, 2000

(51) Int. Cl.[7] .................................................. B23P 17/00
(52) U.S. Cl. ........................... 29/894.323; 29/894.322; 29/894.32; 29/418; 29/894.351; 301/63.101; 301/63.106; 301/65; 428/577
(58) Field of Search ............... 29/894, 894.32–894.325, 29/894.3, 894.351, 414, 415, 418; 428/577, 582, 583; 301/63.101–63.106, 65

(56) References Cited

U.S. PATENT DOCUMENTS 3,235,312 A * 2/1966 Hollander .............. 29/894.322
6,272,748 B1 * 8/2001 Smyth .................... 29/894.322

FOREIGN PATENT DOCUMENTS

JP 55-36034 * 3/1980 ............ 29/894.322
JP 61-86038 * 5/1986 ............ 29/894.322

* cited by examiner

Primary Examiner—P. W. Echols
(74) Attorney, Agent, or Firm—Shlesinger, Fitzsimmons & Shlesinger

(57) ABSTRACT

A two-piece tire rim is prepared from a molded, one-piece wheel casting which is generally cup-shaped in configuration. The casting, which is open at one end and closed at its opposite end, has an inner annular recess formed coaxially in the inner surface of its closed end, and has formed coaxially in its outer peripheral surface an external annular recess radially spaced from, and in axial registry with an internal annular recess. The casting is separated into two separate sections by cutting through the casting in a circular path extending from the external annular recess to the internal annular recess, thereby producing a generally annular shaped inner rim section, and a generally disc-shaped outer rim section. The two rim sections are then machined to final form, and are secured together to form the desired two-piece tire rim.

6 Claims, 2 Drawing Sheets

WHEEL CASTING AND WHEEL ASSEMBLY

BACKGROUND OF THE INVENTION

This invention relates to an improved wheel casting, and the method of preparing the two-piece tire rim from the casting. More specifically, this invention relates to a molded, one-piece wheel casting, and the method of preparing from the one-piece casting a two-piece tire rim.

Heretofore it has been customary to manufacture certain types of tire rims from two separately molded parts or wheel castings, which are circular in configuration and are referred to as the inner and outer rim castings. After the two parts are separately molded they are bolted, welded or otherwise secured coaxially together to form a final, two-piece tire rim.

The major disadvantage of prior, two-piece tire rims of the type described is that it has been necessary to prepare and utilize two different molds, one to prepare the outer rim casting, and the other to prepare the inner rim casting. For each ultimate tire rim, therefore, there has to be made a different casting for each of the inner and outer rims, each casting requiring associated labor costs.

It is an object of this invention, therefore, to considerably reduce the number of molds and castings required to prepare two-piece tire rims of the typed described, and also to considerably reduce the associated labor costs.

To this end, it is an object of this invention to provide one mold for producing a single wheel casting which is ultimately divided into what become the inner and outer rims of a two-piece tire rim. More particularly, this invention relates also to a method of producing a novel wheel casting in a single mold, and subsequently machining the molded wheel into separate rims, inner and outer, respectively, which are then secured together to produce a two-piece tire rim of the type that formerly required the separate casting of two separate rim sections, the inner, and outer, respectively.

Other objects of the invention will be apparent hereinafter from the specification and from the recital of the appended claims, particular when read in conjunction with the accompanying drawings.

SUMMARY OF THE INVENTION

A molded, one-piece wheel casting which is generally cup-shaped in configuration, is open at one end, closed at its opposite end. The closed end of the casting has formed coaxially in its inner surface an inner annular recess facing the open end of said casting, and has formed coaxially in its outer peripheral surface an external annular recess radially spaced from and in axial registry with the internal annular recess. A two-piece tire rim is prepared by cutting through the closed end of the casting from the outer to the inner annular recess, thus separating the casting into generally annular and disc-shaped sections, respectively. The two sections are then separately machined and joined together to form a two-piece tire rim.

THE DRAWINGS

Figure 3:
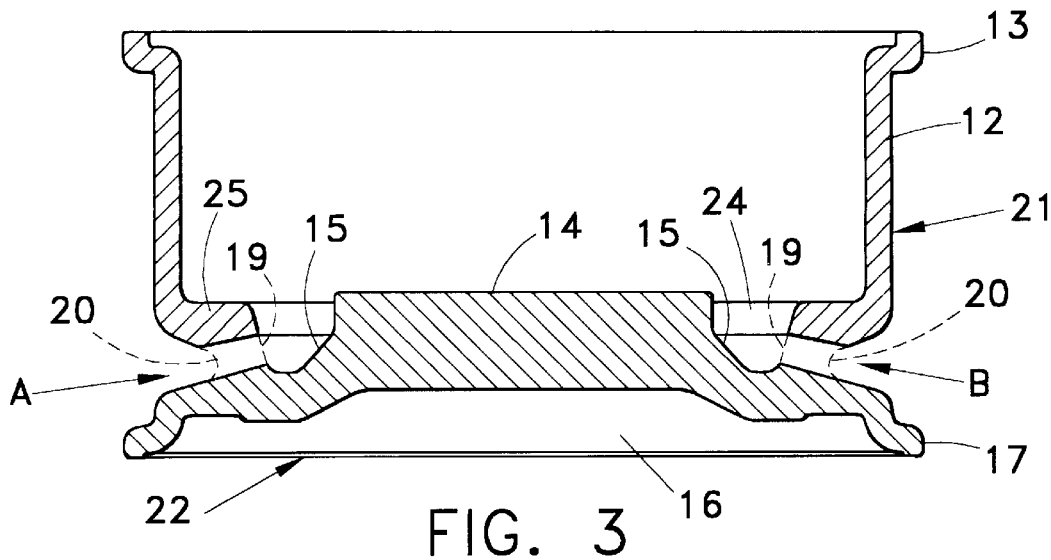
FIG. 3 is an axial section view through the casting of FIG. 1, but illustrating how the casting is separated into two separate rim sections by machining operations which remove portions of the casting as denoted by the arrows A and B.
Figure 4:
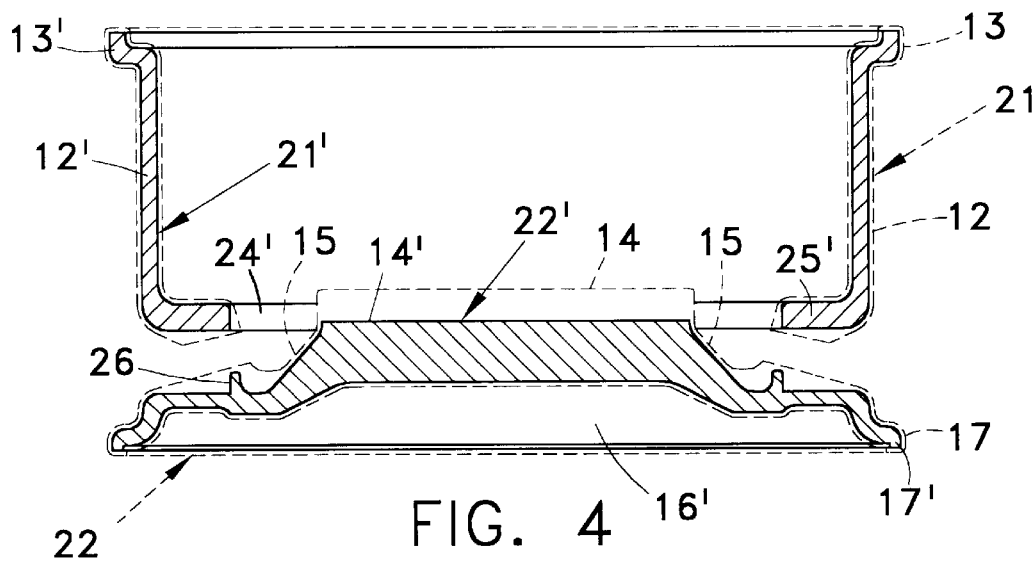
Figure 5:
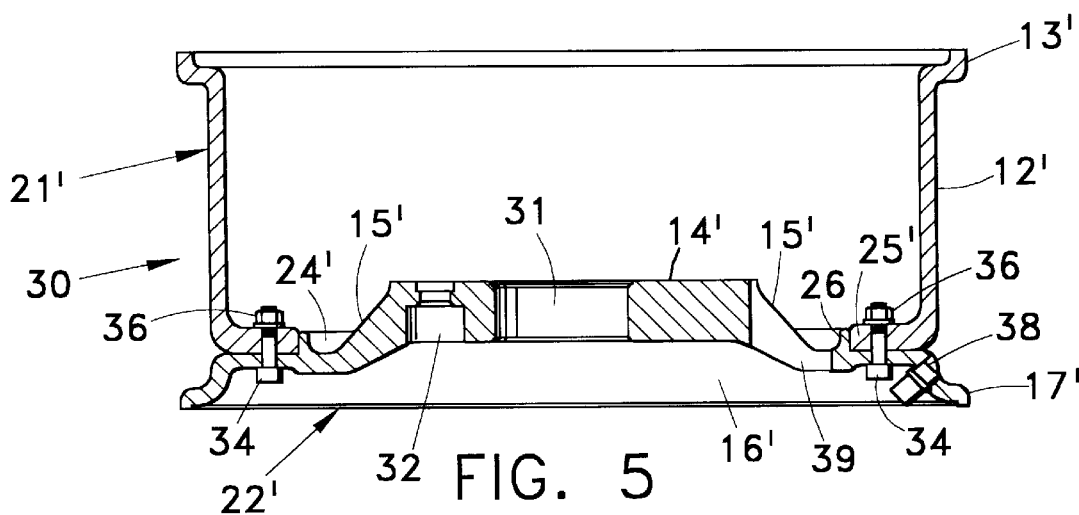

FIG. 4 is a view generally similar to the casting as separated into two separate pieces as shown in FIG. 3, except that in FIG. 4 the broken lines illustrate the casting as it appears when it is initially separated into two separate sections, and illustrated in section and in solid lines are the final configurations of the two separate inner and outer rim sections as they appear after each section has been machined to remove from its outer surfaces the material enclosed within the broken lines and outwardly of the solid lines of the two separate parts; and FIG. 5 illustrates the two rim sections as they appear when they are finally bolted together to form the completed tire rim.

DETAILED DESCRIPTION OF THE PREFERRED EMBODIMENTS

Figure 1:
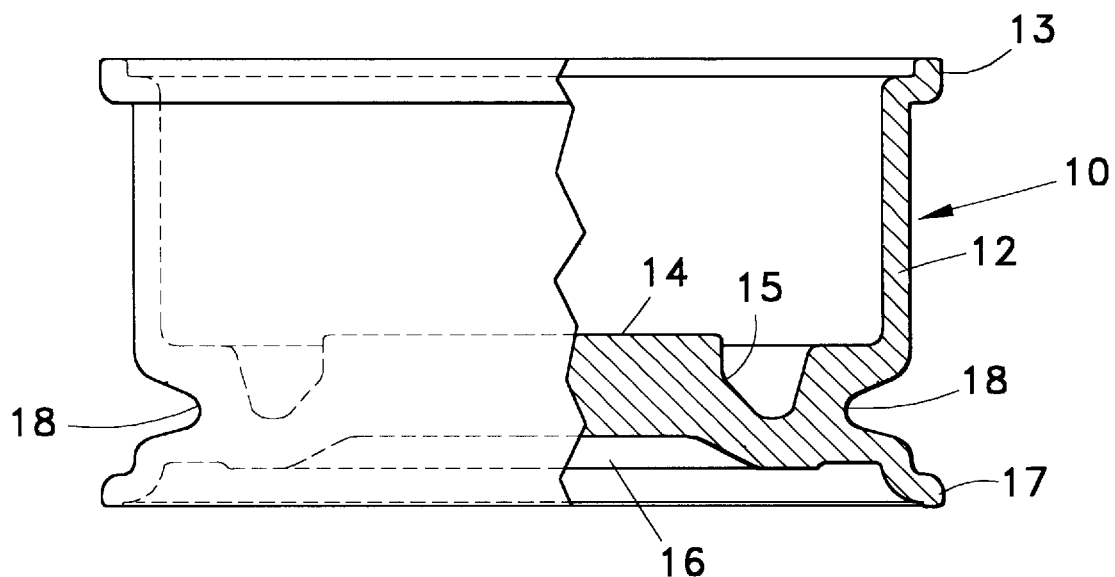
FIG. 1 is a front elevational view, partially in section, of a one-piece molded wheel casting made according to one embodiment of this invention.
Figure 2:
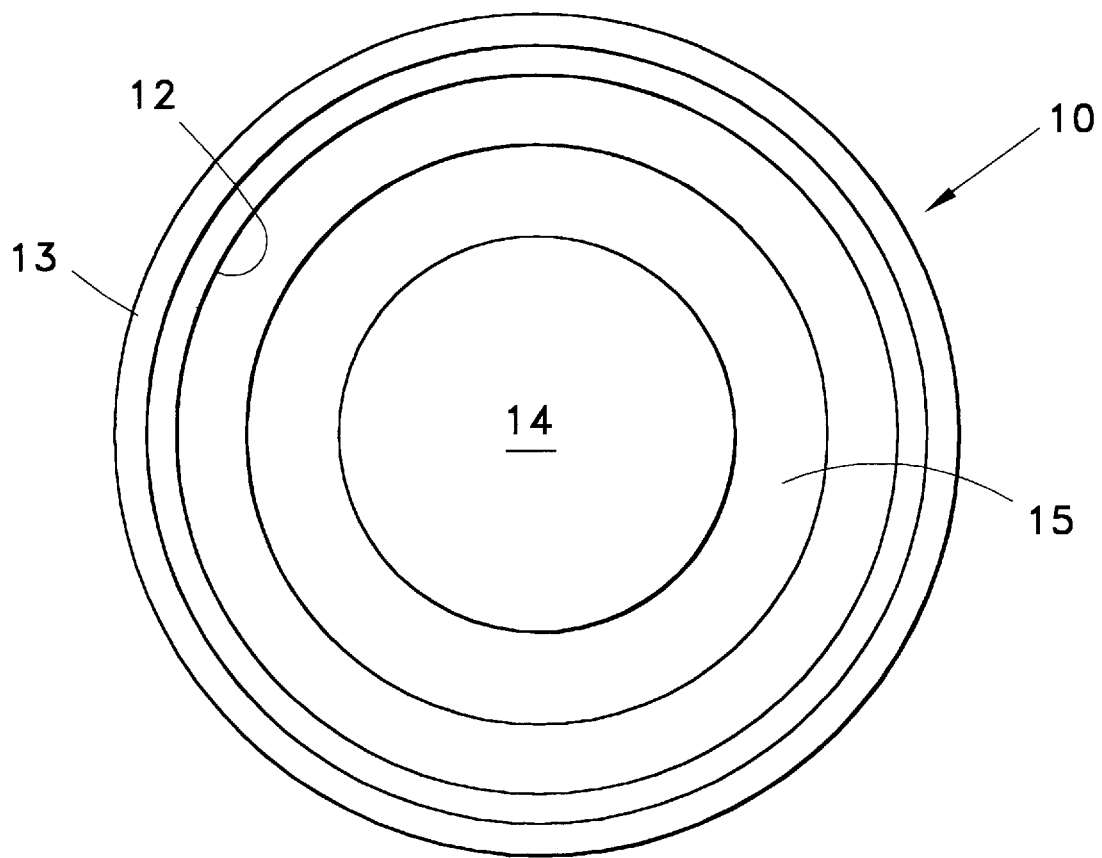
FIG. 2 is a top plan view of this wheel casting.

Referring now to the drawings by numerals of reference, and first to FIGS. 1 and 2, the first step in producing a two-piece tire rim in accordance with this invention is to produce in a single mold a one-piece generally a cup-shaped metal wheel casting 10 having intermediate its ends an annular wall section 12. Wall section 12 has an upper, open end surrounded by an integral, outwardly flaring circumferential flange section 13, and is closed at its lower end by an integral, transversely extending wall section 14. Wall section 14 has in its inner surface within the cup-shaped wheel casting 10, an inner, circumferential recess 15 which is disposed radially inwardly of wall section 12, and coaxially of the center line of the casting 10. In its external surface remote from its surface containing recess 15, wall section 14 has centrally therein a large, circumferential recess 16 which is disposed coaxially of the casting 10, and which creates around the closed, lower end of the casting an integral, outwardly flaring circumferential flange 17. Wall section 14 also has in its outer peripheral surface between the lower end of section 12 and flange 17, an outer annular groove or recess 18, which is disposed coaxially of the axis of casting 10, and which has a curved bottom surface registering with and radially spaced from the inner recess 15 in section 14.

To prepare the casting 10 for use in making a two-piece tire rim, the portion of the casting 10 between the recess 15 in the inner surface of wall section 14, and the recess 18 formed in the outer peripheral surface of the wall section, is removed by machining through the casting with a lathe or the like in the directions denoted by arrows A and B in FIG. 3, thereby to remove the portion of the casting located between the broken lines denoted by the numerals 19 and 20 in FIG. 3. The result of this machining operation is to separate the casting 10 into two separate parts, which in FIG. 3 are denoted generally the numerals 21 and 22, the former being generally annular in configuration and having in the end thereof remote from flange 13 a central opening 24 surrounded by a flange 25, and the latter being generally disc-shaped. Parts 21 and 22 are then machined further to produce the two semifinished inner and outer rim sections which are shown in section and in solid lines in FIG. 4, and which are denoted generally by the numerals 21' and 22', respectively. Aside from forming on outer rim section 22' an annular boss 26, about the only difference between the two sections 21 and 22 as shown in FIG. 3 and the semifinished sections 21' and 22' as shown in FIG. 4 is the fact that certain portions of the surfaces of 21 and 22 have been removed to produce the machined sections 21' and 22'. For that reason the prime sign has been used with certain numerals to reflect the similarities between the two parts before and after their outer surfaces have been machined.

Referring now to FIG. 5, 30 denotes generally a completed tire rim produced from the now completely finished inner and outer rim sections 21' and 22'. To complete the rim 30, outer rim part 22' has formed coaxially therethrough, and centrally thereof, a circular opening or bore 31. Part 22' also has formed therethrough a plurality of circular openings 32 (only one of which is shown in FIG. 5), which are equiradially and equiangularly spaced about the bore 31 with the axes thereof extending parallel to the axis of the rim. The openings 32 are employed for accommodating the usual bolts and nuts which are employed for securing the rim 30 in a conventional manner to one end of an automotive axle for rotation thereby. Also, the annular boss 26 on part 22' is inserted coaxially into the flanged opening 24' in part 21' with the outer peripheral surface thereof confronting immediately upon the inner peripheral surface of the flange 25' that is formed on the lower end of the part 21'. This places the plane outer surface of the flange 25' in coplanar engagement with the surface of the part 22' outwardly of the boss 26, which therefore retains the part 12' coaxially of the part 22'. Part 21' is then secured releasably to part 22' by a plurality of bolts 34 (two of which are shown in FIG. 5), the externally threaded shanks of which bolts pass through registering openings in the part 22' and flange 25' and are threaded at their inner ends into conventional nuts 36 which engage the inner surface of the flange 25'. Although only two such bolts 34 are shown in FIG. 5, it will be appreciated that a plurality of such bolts are employed at equiangularly spaced points about the common axis of parts 21' and 22' releasably to secure the former part to the latter part.

This completes the assembly of the two-piece rim 30, but in order to accommodate the valve stem of any associated tire and/or tube mounted on the rim 30, the annular wall section of the part 22', adjacent its flange 17', has therethrough a circular opening 38 for accommodating any valve stem which may be used to inflate a tube or tubeless tire which may be mounted on the rim 30. Finally, depending upon the particular design of the rim 30 the part 22' may have formed therethrough inwardly of the annular boss 26 two or more openings, one of which is denoted at 39, and which may be employed simply to improve the appearance of the rim.

From the foregoing it will be apparent that the present invention provides an inexpensive method and means for providing a two-piece tire rim which can be manufactured and produced at a cost far less than the cost encountered when separate and differently shaped portions of the tire rim are produced as separate castings. With applicant's invention a single casting is made for what in essence will be a two piece tire rim. Then, with a few inexpensive machining operations the two separate rim sections, which heretofore had to be separately cast, can be readily machined and easily assembled. Moreover, while this invention has been illustrated and described in detail in connection with only certain embodiments thereof, it will be apparent to one skilled in the art that the invention is capable of further modification, and that this application is intended to cover any such modifications as may fall within the scope of one skilled in the art, or the appended claims.

What is claimed is:

1. A method of producing a two-piece tire rim having inner and outer rim sections, respectively, comprising molding a one-piece generally cup-shaped metal wheel casting having an annular wall section open at one end and having a generally disc-shaped end wall section integral with and closing the opposite end of said annular wall section coaxially thereof, said molding including forming on said casting an external annular recess in the outer peripheral surface of said end wall section coaxially thereof, and in said casting an internal annular recess coaxially in the inner surface of said end wall section, said annular recesses being disposed in radially spaced registering relation, separating said annular wall section from said end wall section by cutting through said end wall section in a path extending between said inner and said outer annular recesses, individually machining the two now-separated sections of said casting to form therefrom an inner rim section and an outer rim section, and securing said inner and outer rim sections coaxially one to the other to complete said tire rim.

2. A method as defined in claim 1, including during said molding, forming coaxailly around said open end of said annular wall section an integral external circumferential flange, forming a circumferential recess centrally and coaxially in the outer surface of said end wall section of said casting, and forming on said end wall section and coaxially around said circumferential recess an integral, external circumferential flange.

3. A method as defined in claim 1, including during the individual machining of said two separated sections forming a central opening through said end wall section coaxially thereof, and a small opening extending from said circumferential recess to the exterior of said end wall section for accommodating the valve stem of a tire.

4. A method as defined in claim 1, wherein the separating of said annular wall section from said end wall section includes forming an opening in said opposite end of said annular wall section coaxially thereof.

5. A one-piece wheel casting for use in making a two-piece tire rim from two sections of the casing, comprising a generally cup-shaped metal casting open at one end thereof and closed at its opposite end, the open end of said casting having formed coaxially thereon an outwardly flaring circumferential flange, and the closed end of said casting having formed coaxially and centrally in the outer surface thereof a circumferential recess surrounded by an outwardly flaring circumferential flange, the closed end of said casting having formed coaxially in the inner surface thereof an inner annular recess facing said open end of said casting, and said casting having formed coaxially in the outer peripheral surface of the closed end thereof an external annular recess radially spaced from and in axial registry with said internal annular recess.

6. A one-piece wheel casting as defined in claim 5, wherein said casting includes an annular wall section having an open end forming said open end of the casting, and a generally disc-shaped section integral with and closing the opposite end of said annular wall section coaxially thereof, and forming the closed end of said casting, said annular wall section of said casting being disposed to be separated from said disc-shaped section by cutting through the portion of the casting separating said inner annular recess in the casting from said registering outer annular recess.

\* \* \* \* \*